United States Patent
Maruyama et al.

(10) Patent No.: US 7,301,259 B2
(45) Date of Patent: Nov. 27, 2007

(54) VIBRATION TYPE DRIVING APPARATUS

(75) Inventors: Yutaka Maruyama, Tokyo (JP); Kiyoshi Nitto, Saitama (JP); Takeshi Kumazawa, Handa (JP); Naoki Soumiya, Handa (JP)

(73) Assignees: Canon Kabushiki Kaisha, Tokyo (JP); Mino Ceramic Co., Ltd., Nagoya (JP)

( * ) Notice: Subject to any disclaimer, the term of this patent is extended or adjusted under 35 U.S.C. 154(b) by 0 days.

(21) Appl. No.: 11/212,648

(22) Filed: Aug. 29, 2005

(65) Prior Publication Data

US 2006/0043845 A1 Mar. 2, 2006

(30) Foreign Application Priority Data

Aug. 31, 2004 (JP) ............................. 2004-251977

(51) Int. Cl.
*H01L 41/04* (2006.01)
(52) U.S. Cl. ................................. 310/323.11
(58) Field of Classification Search ............ 310/323.11
See application file for complete search history.

(56) References Cited

U.S. PATENT DOCUMENTS

| | | | |
|---|---|---|---|
| 5,917,269 A | 6/1999 | Maruyama et al. | 310/323 |
| 6,888,288 B2 | 5/2005 | Seki et al. | 310/323.16 |
| 6,930,436 B2 | 8/2005 | Tsukimoto et al. | 310/323.02 |
| 2002/0165615 A1* | 11/2002 | Abouaf et al. | 623/22.21 |
| 2003/0122451 A1* | 7/2003 | Seki et al. | 310/323.01 |

FOREIGN PATENT DOCUMENTS

| | | |
|---|---|---|
| JP | 5-252767 | 9/1993 |
| JP | 9-289785 | 11/1997 |
| JP | 10-42579 | 2/1998 |
| JP | 2003-134858 | 5/2003 |
| JP | 2003-199376 | 7/2003 |
| JP | 2003-209983 | 7/2003 |

OTHER PUBLICATIONS

In-Vitro Wear During Micro-Seperation of Zirconia Toughened Alumina for Total Hip Joint Replacements, Stewart et al., Jun. 2001.*
ZTA-96 Zirconia Youghened Alumina, Astro Met, Inc., Dec. 15, 2002.*
Zirconia—AmZirOx 86, Astro Met, Inc., Dec. 15, 2002.*

* cited by examiner

*Primary Examiner*—Darren Schuberg
*Assistant Examiner*—Derek Rosenau
(74) *Attorney, Agent, or Firm*—Fitzpatrick, Cella, Harper & Scinto (57) ABSTRACT

A vibration type driving apparatus capable of inhibiting wear in an elastic member and a contact member is provided. The vibration type driving apparatus is a vibration type driving apparatus relatively driving an elastic member given vibrations by an electric-mechanical energy conversion element and a contact member contacting the elastic member, wherein at least one of the elastic member and the contact member is formed by aluminum oxide ceramics containing 5 wt % to 40 wt % of zirconium oxide.

8 Claims, 5 Drawing Sheets

VIBRATION TYPE DRIVING APPARATUS

BACKGROUND OF THE INVENTION

1. Field of the Invention

The present invention relates to a vibration type driving apparatus relatively driving an elastic member and a contact member contacting the elastic member.

2. Description of the Related Art

A vibration type driving apparatus (e.g., ultrasonic motor) causes an elastic member with a piezoelectric element fixed thereon to excite progressive and standing oscillatory waves by application of an alternating-current voltage to the piezoelectric element, thereby rotating a rotor kept in contact with the elastic member.

In Japanese Patent Application Laid-Open No. H05-252767 and Japanese Patent Application Laid-Open No. H09-289785 are disclosed vibration type driving apparatuses in which a frictional member is provided in an area of an elastic member contacting a rotor, and for the material of the frictional member, polymeric materials and metallic materials are used.

In a conventional rod type vibration type driving apparatus, the surface of an elastic member made of brass is coated with an electroless nickel plating containing silicon carbide particles having a wear resistance. Alumite with aluminum subjected to an anodization treatment is used as a rotor. However, in the vibration type driving apparatus formed of the materials described above, drive time was relatively short for inhibiting an increase in wear loss amount.

Thus, in Japanese Patent Application Laid-Open No. H10-42579 is disclosed a vibration type driving apparatus in which a frictional member is formed of ceramics excellent in wear resistance property, specifically aluminum oxide ceramics which is easy to obtain and inexpensive, for improving the lifetime of the frictional member and making it possible to use the frictional member in a wide range of applications. In this case, compared with the case where the electroless nickel plating containing silicon carbide particles is coated, the wear resistance is improved, thus making it possible to improve the lifetime of the vibration type driving apparatus.

In Japanese Patent Application Laid-Open No. 2003-134858, Japanese Patent Application Laid-Open No. 2003-199376 and Japanese Patent Application Laid-Open No. 2003-209983 is proposed a vibration type driving apparatus downsized so that the vibration type driving apparatus can be mounted on a small-sized device.

However, the aluminum oxide ceramics is poor in toughness compared with metallic materials, and therefore if the frictional member is formed of the aluminum oxide ceramics, cracking and chipping tend to occur in a production step such as processing. Moreover, it may be impossible to obtain a sufficient wear resistance in the drive of the vibration type driving apparatus.

Particularly, in the downsized vibration type driving apparatus, further enhancement of strength is required for an improvement in reliability of the elastic member, and development of a material resisting cracking and chipping and showing high strength and high toughness is desired for an abrasive member. The need for reduction of costs for the vibration type driving apparatus is strong, and it is thus preferable that material costs and production costs are low.

SUMMARY OF THE INVENTION

At least one of suitable embodiments of the present invention is a vibration type driving apparatus relatively driving an elastic member in which vibrations are excited by an electric-mechanical energy conversion element, and a contact member contacting the elastic member, wherein at least one of the elastic member and the contact member is formed by aluminum oxide ceramics containing 5 wt % to 40 wt % of zirconium oxide.

Further features of the present invention will become apparent from the following detailed description of exemplary embodiments with reference to the attached drawings.

DETAILED DESCRIPTION OF THE EMBODIMENTS

The following description of at least one exemplary embodiment is merely illustrative in nature and is in no way intended to limit the invention, its application, or uses.

Certain processes, techniques, apparatus, and materials known to one of ordinary skill in the relevant art may not be discussed in detail, but are intended to be part of the enabling description where appropriate.

Exemplary embodiments will be described in detail below with reference to the drawings.

Figure 1:
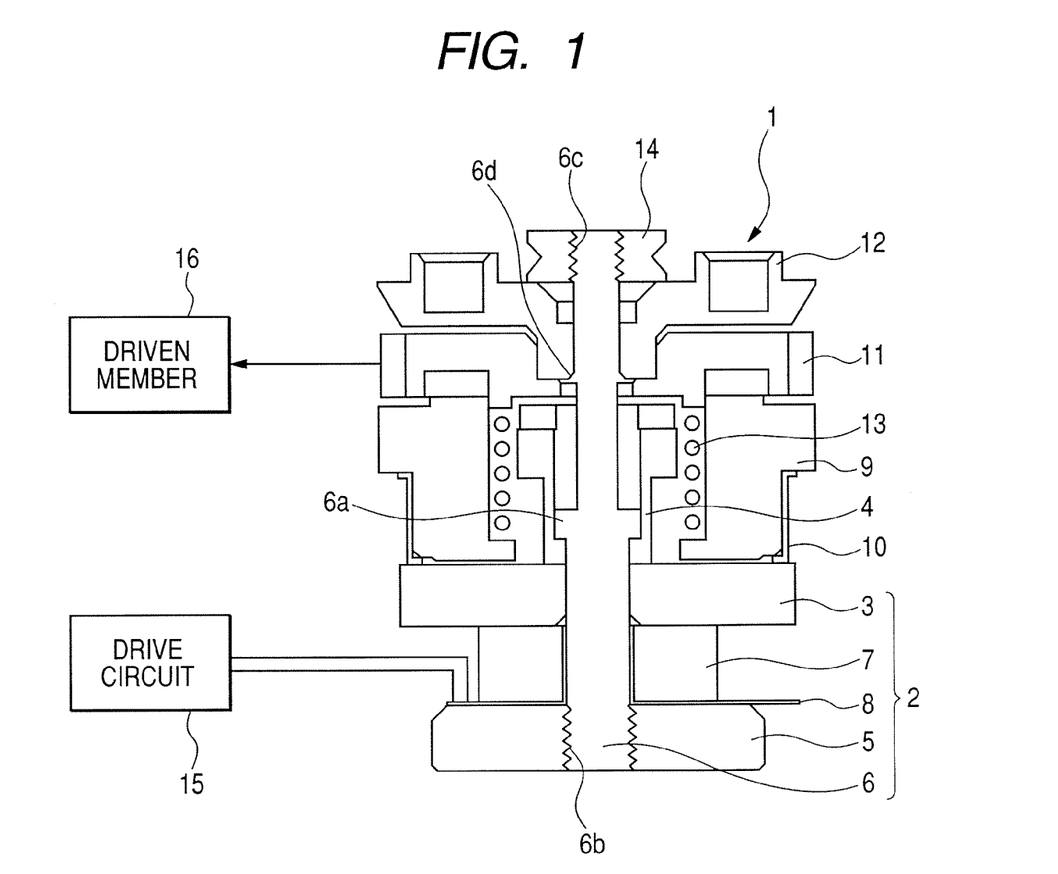
FIG. 1 is a sectional view of a vibration type driving apparatus as an embodiment of the present invention.

A sectional view of a vibration type driving apparatus (oscillatory wave motor) as an embodiment of the present invention is shown in FIG. 1.

A flange portion 6a of a shaft 6 contacts an end surface formed inside a first elastic member 4. Here, a second elastic member 5 is brought into engagement with a screw portion 6b formed on one end side of the shaft 6, whereby a third elastic member 3, a layered piezoelectric element 7 and a flexible wiring board 8 are sandwiched between the flange portion 6a and the second elastic member 5 to form a vibration body 2.

In the layered piezoelectric element 7, a plurality of electrode layers and piezoelectric layers are placed alternately, and in each electrode layer, grouped electrode groups (electrode groups of A phase and B phase) are formed.

A contact member 10 formed by press-molding a stainless plate and hardening the same is attached to a rotor 9.

A compression coil spring 13 is placed between the rotor 9 and a gear 11 engaging with the rotor 9. The contact member 10 is abutted against the third elastic member 3 by receiving a biasing force of the compression coil spring 13 via the rotor 9.

The gear 11 and the flange member 12 are inserted from the other end side of the shaft 6, and the gear 11 engages with the flange member 12. Here, the flange member 12 is positioned in a direction of thrust of the shaft 6 by a nut 14 engaging with a screw portion 6c formed on the other end side of the shaft 6 and a cylindrical small raised portion 6d provided on the shaft 6. In this way, the gear 11 and the rotor 9 can stably rotate about the axis of the shaft 6 without slanting with respect to the shaft 6.

Alternating-current voltages or pulse voltages different in phase by 90 degrees are applied to two electrode groups (electrode groups of A phase and B phase) of the layered piezoelectric element 7 via the flexible wiring board 8 from a drive circuit 15. Then, in the vibration body 2, two mutually orthogonal bending vibrations (bending vibrations in a front-to-rear direction and bending vibrations in a left-to-right direction in FIG. 1) are simultaneously driven and combined. Consequently, a progressive oscillatory wave (progressive wave) is generated on the surface of the third elastic member 3 on the rotor 9 side, and a frictional force by this progressive wave causes the contact member 10 and the rotor 9 to rotate with respect to the third elastic member 3.

The gear 11 is also rotated with the rotor 9, and a rotary force of the gear 11 is transmitted to a driven member 16 via a power transmission mechanism (not shown). In this way, the driven member 16 is driven. Here, the driven members 16 include, for example, zoom lenses and focus lenses provided in a lens-built-in camera (actuator) and lens apparatus (actuator) and photosensitive drums provided in an image forming apparatus (actuator) such as a copier. Namely, the vibration type driving apparatus 1 of this embodiment is used as a drive source for various driven members 16.

In a conventional vibration type driving apparatus, aluminum oxide ceramics having purity of 99.5% or greater is used as a material forming the third elastic member 3, but in this embodiment, aluminum oxide ceramics containing zirconium oxide is used. The aluminum oxide ceramics containing zirconium oxide is mechanically processed to form the third elastic member 3.

Zirconium oxide is an oxide ceramic like aluminum oxide, and it can be mixed and dispersed and sintered in air, and is superior to other materials in terms of production costs of the third elastic member 3. Therefore, in this embodiment, zirconium oxide is used with aluminum oxide.

A method for producing the third elastic member 3 in this embodiment will now be described.

First, an aluminum oxide powder having a purity of 99.5% or greater and an average particle diameter of 1 μm or less, and a zirconium oxide powder having a purity of 99% or greater and an average particle diameter of 1 μm or less are prepared. The aluminum oxide powder and the zirconium oxide powder are sufficiently mixed by wet mixing and dispersed, and then granulated into granules by spray drying using a predetermined binder, and the granules are molded into a predetermined shape by a mold press.

The above-mentioned molded product is sintered in air for a maximum of 4 hours under optimum temperature conditions for respective mixing ratios (specifically, 1450 to 1650° C.). Here, in this embodiment, the molded material after sintering was made to have a size preset as a size of the third elastic member 3, i.e., an outer diameter of 10 mm and an inner diameter of 1.65 mm, and processing regarding the outer diameter and the inner diameter was not carried out after sintering. By omitting processing after sintering in this way, the cost can be reduced.

The thickness of the molded material after sintering is 1.7 to 1.8 mm, and both end surfaces were ground using a diamond abrasive as coarse processing, whereby the molded material was made to have a thickness of 1.51 to 1.52 mm.

Here, if grinding streaks after coarse processing remain on the surface (friction surface) of the third elastic member 3 contacted by the end portion of the contact member 10, the end portion of the metallic contact member 10 tends to be worn by friction with the above-mentioned friction surface when the vibration type driving apparatus 1 is driven.

The friction surface of the contact member 10 is finished by lap processing to have an arithmetic average height Ra of 0.1 μm to 0.05 μm. The contact member 10 is made of stainless steel, which is more flexible than alumina, and therefore it can be easily processed for a relatively short time. Since in fact, the flexible contact member 10 is more easily worn during driving, and the roughness of the surface becomes gradually worse from the start of driving than the roughness of the surface initially finished, the contact member 10 should be initially finished to some degree. However, the contact member 10 is not required to be managed as stringently as the elastic member 3 is managed.

Thus, in this embodiment, the coarsely processed surface was mirror-polished by wet lapping using a diamond abrasive having an average particle diameter of about 1 to 6 μm and a tin lapping board as finish processing of the third elastic member 3.

The arithmetic average height Ra (based on JIS B0601-2001, ISO 4287-1997) in the mirror-polished surface was 0.2 μm. The thickness of the third elastic member 3 finally formed by mirror polishing was 1.50 μm.

Here, the value of the arithmetic average height Ra in the frictional surface of the third elastic member 3 can be further reduced to a value smaller than 0.2 μm, i.e., the frictional surface can be made further flat. The frictional surface of the third elastic member 3 can be made to have an arithmetic average height Ra of about 0.02 μm by mirror-polishing the frictional surface under a predetermined processing condition for a sufficient time.

Here, the third elastic member 3 formed of aluminum oxide ceramics containing a predetermined amount of zirconium oxide was used to conduct a wear test by driving of the vibration type driving apparatus 1. The wear test was conducted by driving the vibration type driving apparatus at a rated output (0.5 W) for 40 hours, and then measuring wear depths in 6 to 8 regions of the frictional surface of the third elastic member 3.

Figure 3:
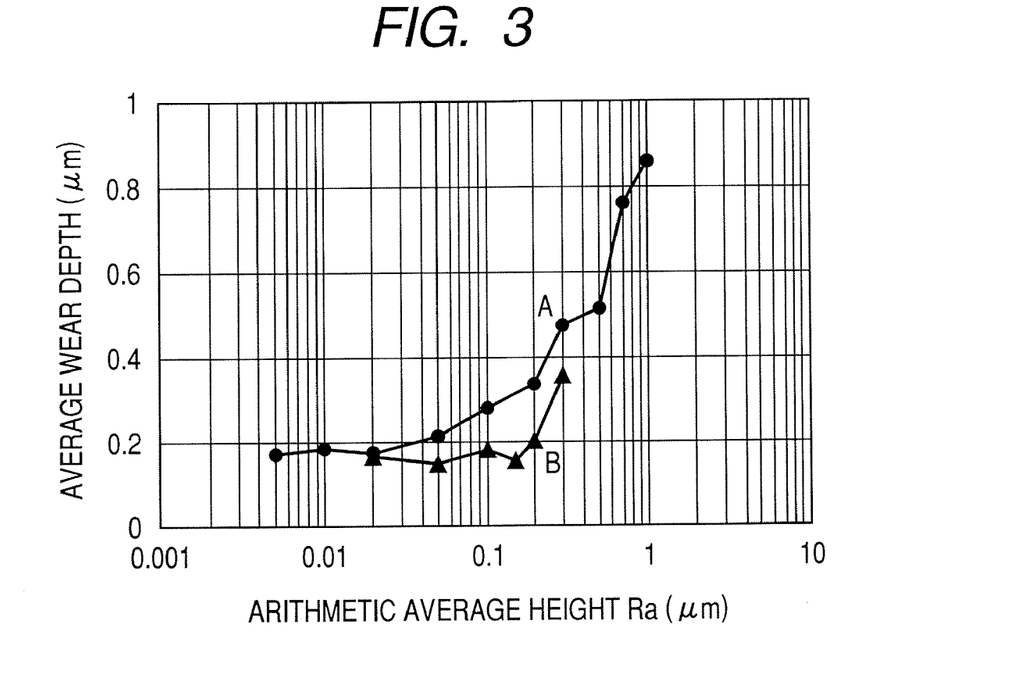
FIG. 3 shows a relation between an arithmetic average height of the surface of the elastic member and an average wear depth in the embodiment of the present invention.

The average of these wear depths is an average wear depth (μm). The graph A of FIG. 3 shows a relation between the arithmetic average height and the average wear depth. In the graph A of FIG. 3, the amount of zirconium oxide added is 20 wt %.

Using third elastic members 3 having frictional surfaces having arithmetic average heights Ra of 0.2 μm and 0.02 μm, respectively, the drive characteristics and wear of the vibration type driving apparatus were compared, and it was found that there was no significant difference between the frictional surfaces. From this fact, it can be understood that the drive characteristics and wear of the vibration type driving apparatus are not influenced, whether the arithmetic average height Ra is 0.2 μm or 0.02 μm.

For example, if the Ra of the coarsely processed surface is greater than 0.2 μm, the end portion of the metallic contact member 10 is significantly worn from the initial stage of driving and thus there is a problem in terms of durability. The drive performance tends to be unstable from the initial stage due to influences of a wearing powder with wear.

Making the coarsely processed surface have an Ra of 0.2 μm by mirror-polishing the surface by wet lapping can be achieved in a relatively short time, and with ease and good productivity. Here, the Ra may be further reduced to a value smaller than 0.02 μm, but it results in prolonged processing time, and is therefore unsuitable in practical production if considering productivity and production costs.

The mirror-polished frictional surface was observed by an electron microscope, and it was found that the crystal particle diameter of aluminum oxide was 0.5 to 6 μm and the crystal particle diameter of zirconium oxide was 0.1 to 2.0 μm.

Figure 2A:
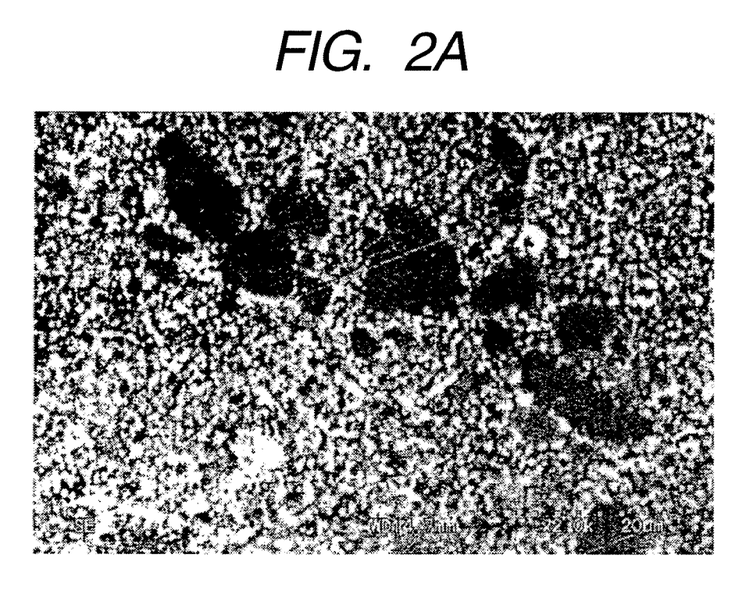
FIG. 2A shows a scanning electron beam image of the surface of an elastic member in the embodiment of the present invention.
Figure 2B:
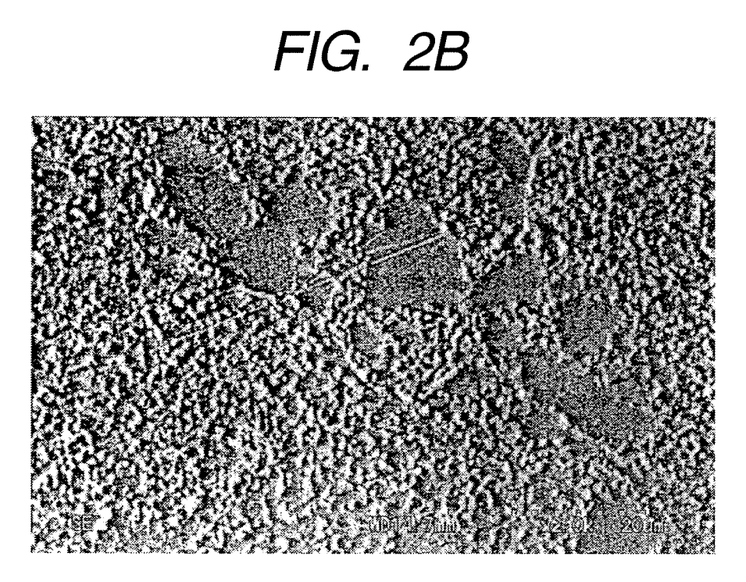
FIG. 2B shows an image obtained by differentiating a detection signal of FIG. 2A with time.

FIGS. 2A and 2B each show a state in which the frictional surface of the third elastic member 3 formed of aluminum oxide ceramics having 20 wt % of zirconium oxide added thereto was observed by the electron microscope. Here, FIG. 2A shows a scanning electron beam image, in which black regions show crystal particles of aluminum oxide, and white regions show crystal particles of zirconium oxide. As shown in FIG. 2A, white regions smaller than the black regions exist around each black region.

The mirror-polished frictional surface was closely observed by the electron microscope, and it was found that slight irregularities (elevation differences) exist on the frictional surface due to aluminum oxide particles and zirconium oxides.

FIG. 2B is a view in which irregularities on the frictional surface are highlighted by carrying out image processing of differentiating a detection signal of the scanning electron beam image with time. As shown in FIG. 2B, zirconium oxide particles (areas corresponding to white regions in FIG. 2A) are raised by about 0.05 μm compared with aluminum oxide particles (areas corresponding to black regions in FIG. 2A).

As described above, by carrying out polishing using a diamond abrasive and a tin lap board, a frictional surface having an arithmetic average height Ra of about 0.2 to 0.02 μm can be formed. Here, as a result of changing the materials of the abrasive and the lap board, processing conditions and processing procedures and conducting studies in a variety of ways, there were cases where aluminum oxide particles were raised and where zirconium oxide particles were raised even though the arithmetic average height Ra showed a value the same as the above-mentioned value. Then, a frictional surface showing a value of the arithmetic average height Ra within the range of about 0 μm to 0.2 μm could be formed.

Here, it is conceivable that irregularities occurring on the frictional surface are attributed to differences in hardness and elastic coefficient between the abrasive used in polishing and aluminum oxide crystal particles and zirconium oxide crystal particles, and differences in deformation amount and the like of crystal particles in a stressed state during processing.

Here, when the vibration type driving apparatus was driven and a wear test was conducted in a state in which irregularities having an arithmetic average height Ra of 0.02 μm to 0.2 μm and a size of 0.05 μm to 0.2 μm at the maximum existed on the frictional surface of the third elastic member 3, the vibration type driving apparatus could be stably driven. The absolute magnitude of wear loss amount on the frictional surface was low, and the wear was stable.

The results are shown in graph B of FIG. 3. Provision of irregularities resulted in a reduction in wear. However, the effect of irregularities diminishes as the arithmetic average height Ra approaches 0.05 μm. In this figure, the amount of zirconium oxide added was 20 wt %, and the average wear depth per varying amounts of added zirconium oxide will be described later.

From these results, there is a possibility that because irregularities having an arithmetic average height Ra of 0.2 to 0.02 μm and an elevation difference of 0.2 μm at the maximum are formed on the frictional surface of the third frictional member 3, the wear is stabilized from the initial stage of driving of the vibration type driving apparatus, and the wear after a steady state is reached is stabilized. It is conceivable that this results from the fact that by providing irregularities, a wearing powder on the frictional surface is accumulated in the recess, the wear is reduced and the frictional state is stabilized.

Figure 4:
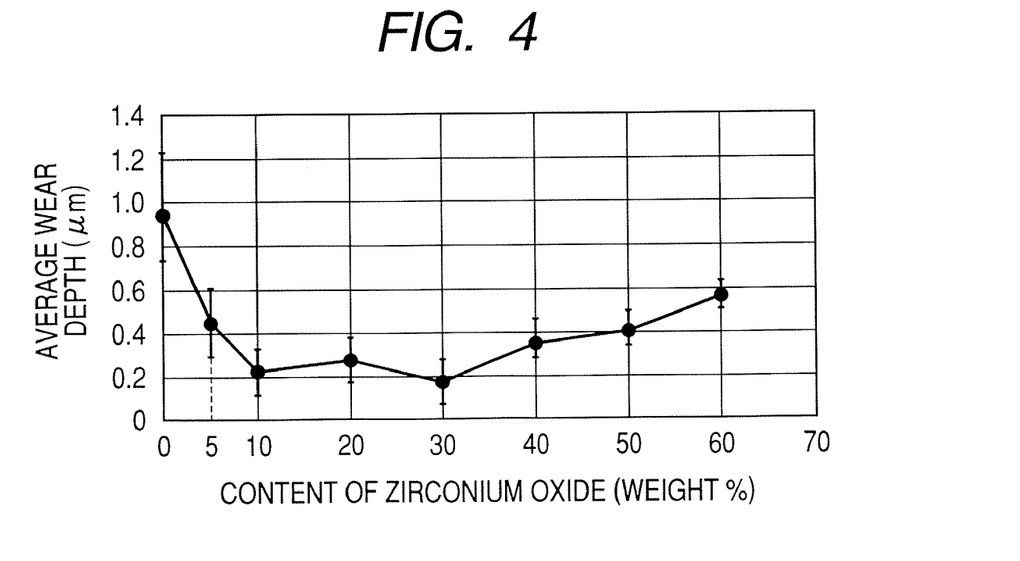
FIG. 4 shows a relation between the content of zirconium oxide and the average wear depth in a worn area of the elastic member.

Then, a wear test by the driving of the vibration type driving apparatus 1 was conducted in the same manner as described previously using third elastic members 3 formed of aluminum oxide ceramics different in content of zirconium oxide. The wear test was conducted by driving the vibration type driving apparatus at a rated output (0.5 W) for 40 hours, and then measuring wear depths in 6 to 8 regions of the frictional surface of the third elastic member 3. The average of these wear depths is an average wear depth (μm).

The results of the above-mentioned wear test are shown in FIG. 4. The longitudinal axis in FIG. 4 shows the average wear depth in 6 to 8 regions of the frictional surface of the third elastic member 3, and the horizontal axis shows the content of zirconium oxide.

As shown in FIG. 4, the average wear depth in the frictional surface was reduced by adding zirconium oxide compared to the case where no zirconium oxide is added. Particularly, when the amount of zirconium oxide added was 5 wt %, the average wear depth was considerably reduced, and wear on the frictional surface was inhibited. Here, the average wear depth is generally equal when the amount of zirconium oxide added is in the range of 5 wt % to 40 wt %, and the average wear depth increases when the amount of zirconium oxide added exceeds 40 wt %.

Here, it is conceivable that if only aluminum oxide is used, aluminum oxide crystal particles fall as wear progresses, and areas from which the particles fall are further worn and progressively damaged. On the other hand, it is conceivable that if zirconium oxide is added to aluminum oxide in an amount of 5 wt % to 40 wt %, the wear loss amount can be reduced as shown in FIG. 4, and therefore aluminum oxide crystal particles are inhibited from falling by zirconium oxide.

If the amount of zirconium oxide added exceeds 40 wt %, the wear loss amount slightly increases as the amount of zirconium oxide added increases as shown in FIG. 4. It is conceivable that the wear loss amount of zirconium oxide increases because zirconium oxide has a hardness lower than that of aluminum oxide.

Here, although the state of dispersion of zirconium oxide in aluminum oxide is preferably uniform, it has been found that the wear property in the frictional surface of the third elastic member 3 is not significantly influenced even though a nonuniform dispersion state is present in at least some regions as shown in FIG. 2.

A starting raw material of the third elastic member 3 can be produced by a liquid phase method represented by a metal alkoxide method or coprecipitation method, which is a multiple oxide production process capable of ensuring high uniformity. However, for the frictional surface of the third elastic member 3, a sufficiently excellent property can be obtained in terms of wear even though the starting material is produced by an inexpensive and common ceramics production process like the production method of this embodiment described above.

Figure 5:
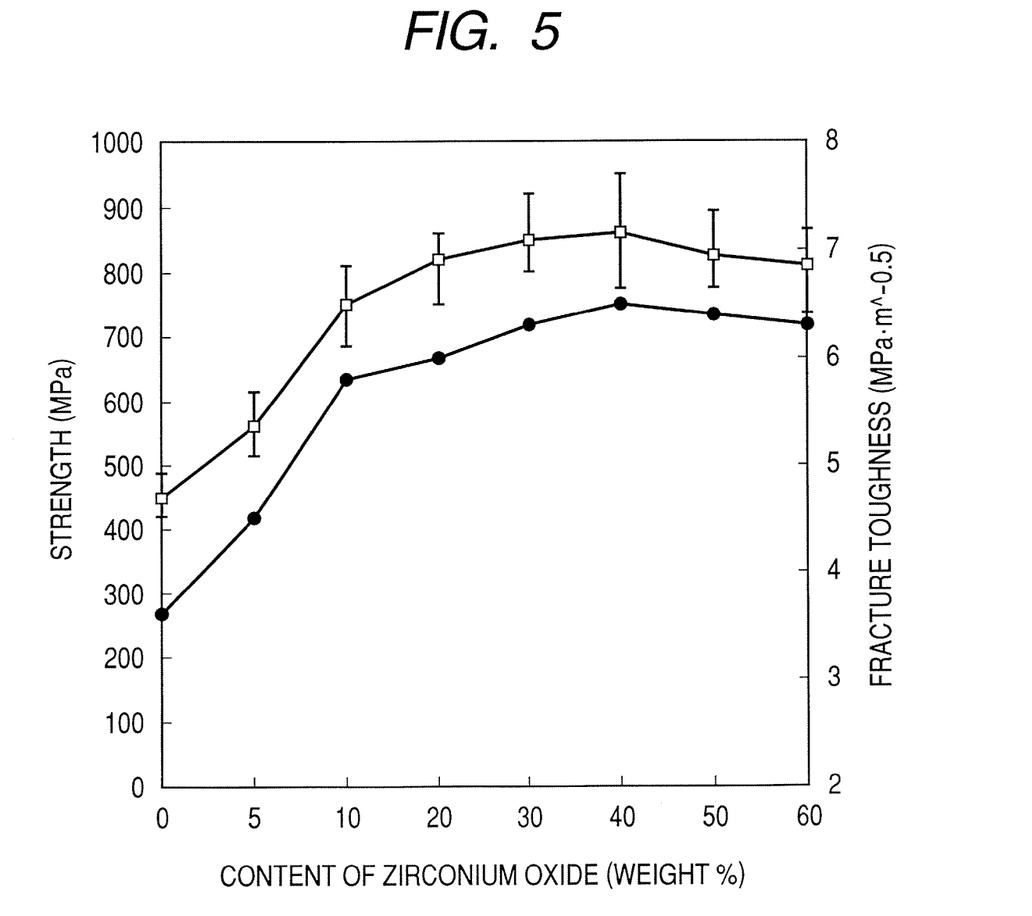
FIG. 5 shows a relation between the content of zirconium oxide and the strength and fracture toughness value of aluminum oxide ceramics.

FIG. 5 shows a relation between the strength and the fracture toughness value at room temperature of 20° C. for aluminum oxide ceramics different in the amount of zirconium oxide added. Here, empty squares in the figure represent the strength and black circles represent the fracture toughness values.

A specimen having a size of 3 mm×4 mm×40 mm as specified in JIS R1601 was fabricated and the strength was measured by a three-point bending method. For the method for measuring the fracture toughness value, many measurement methods for ceramics have been proposed, but in this embodiment, a so-called IF method (indentation fracture method; JIS R1607), in which the surface of the above-mentioned specimen is mirror-processed, an indenter is then introduced with a Vickers hardness meter, and the fracture toughness value is calculated from the length of cracking occurring on the surface, was carried out.

As shown in FIG. 5, the strength and the fracture toughness value of the aluminum oxide ceramics having zirconium oxide added thereto were higher than those of the aluminum oxide ceramics having no zirconium oxide added thereto, and increased until the content of zirconium oxide became a predetermined content.

Here, it is conceivable that the decrease in average wear depth with addition of zirconium oxide shown in FIG. 4 is pertinent to the increase in strength and fracture toughness value shown in FIG. 5. It is conceivable that a principal mechanism for the increase in strength and fracture toughness value of the aluminum oxide ceramics with addition of zirconium oxide consists in the fact that dispersed zirconium oxide particles deviate advancement of cracking, which is a main cause of fracture, and shields cracking.

It is conceivable that the decrease in average wear depth shown in FIG. 4 is due to the fact that cracking occurring around ceramic particles which is a main cause of falling of ceramic particles when wear on the frictional surface progresses is shielded by zirconium oxide. When the third elastic member 3 was actually produced, cracking and chipping of edges during mechanical processing were significantly reduced, and an effect of improving the yield of the member was obtained collaterally.

Zirconium oxide is more expensive than aluminum oxide, and therefore for reducing the cost, a small amount of zirconium oxide within the range of amounts of zirconium oxide allowing a sufficient effect to be obtained in reducing wear is preferably used. Namely, it is preferable that the content of zirconium oxide is in the range of 5 wt % to 40 wt %, and less than 40 wt %.

As apparent from FIG. 4, if the content of zirconium oxide is in the range of 5 wt % to 40 wt %, a sufficient effect is obtained in inhibition of wear compared to the case where no zirconium oxide is added. Here, the amount of zirconium oxide added is more preferably in the range of 10 wt % to 30 wt %. Namely, as shown in the measurement results in FIG. 4, the average wear depth is the smallest when the amount of zirconium oxide added is 10 wt % and 30 wt %, and therefore by setting the amount of zirconium oxide added to an amount within the range between these values, a higher wear inhibition effect is obtained. Since the added amount in the range of 10 wt % to 30 wt % is smaller than 40 wt %, i.e., an upper limit value of the above-mentioned range, the cost can be reduced.

In this embodiment, studies were also conducted on a sintering aid (yttrium oxide) being added to aluminum oxide containing zirconium oxide for reducing production costs. Specifically, predetermined amounts of aluminum oxide powder and zirconium oxide powder were weighed, respectively, mixed with yttrium oxide added thereto, and sintered at 1500° C., 1550° C. and 1600° C. The amount of zirconium oxide was 20 wt %. The relative density of the aluminum oxide ceramics (containing 20 wt % of zirconium oxide) was measured.

Figure 6:
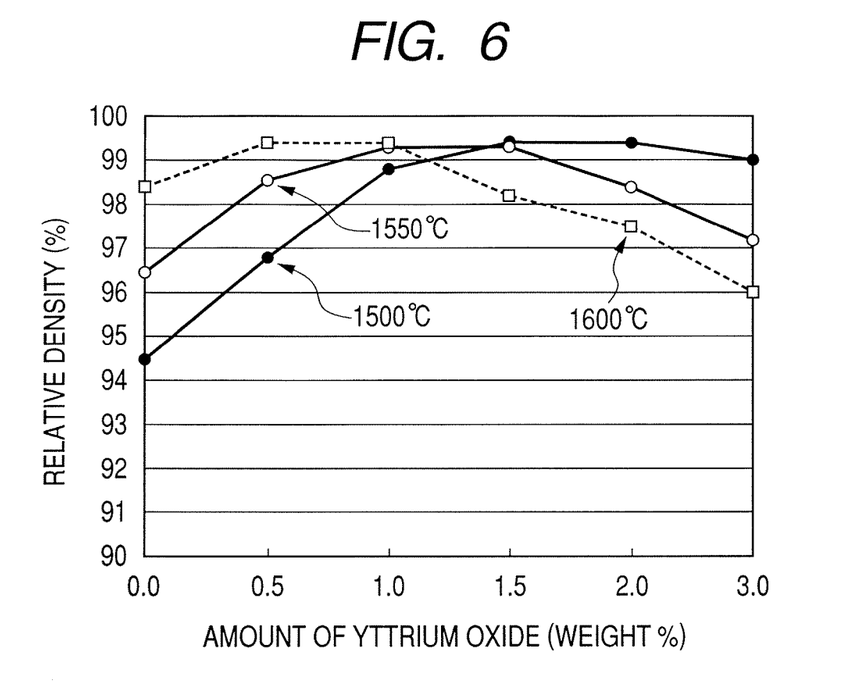
FIG. 6 shows a relation between the amount of yttrium oxide added and the relative density of the elastic member at each sintering temperature.

A relation between the amount of yttrium oxide added and the relative density of the aluminum oxide ceramics (containing zirconium oxide) at each sintering temperature is shown in FIG. 6.

As shown in FIG. 6, at a sintering temperature of 1500° C., densification of the aluminum oxide ceramics can be promoted to improve the relative density when the amount of yttrium oxide added is greater than 0.0 wt % and equal to or less than 2.0 wt %. At a sintering temperature of 1550° C., densification of the aluminum oxide ceramics can be promoted to improve the relative density when the amount of yttrium oxide added is greater than 0.0 wt % and equal to or less than 1.5 wt %. At a sintering temperature of 1600° C., densification of the aluminum oxide ceramics can be promoted to improve the relative density when the amount of yttrium oxide added is greater than 0.0 wt % and equal to or less than 1.0 wt %.

Figure 7:
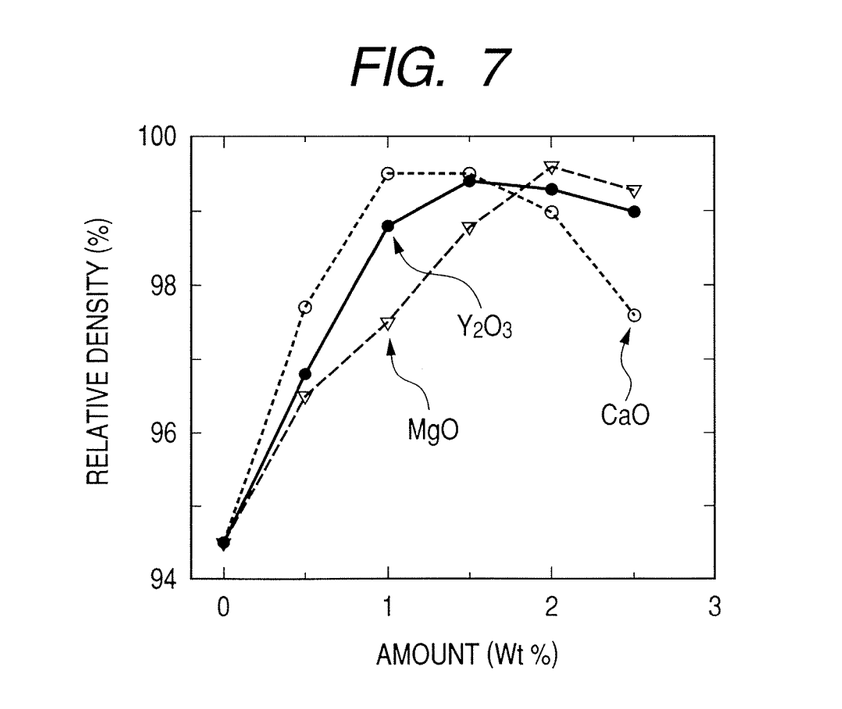
FIG. 7 shows a relation between the amounts of yttrium oxide, calcium oxide and magnesium oxide added and the relative density of the elastic member.

When in place of yttrium oxide, calcium oxide and magnesium oxide were used as sintering aids to make measurement in the same manner as described above, results similar to those with yttrium oxide were shown. When yttrium oxide, calcium oxide and magnesium oxide were mixed such that the total added amount was in the range of 0.5 to 2.0 wt %, and the resultant mixture was used, results similar to those with yttrium oxide alone (FIG. 6) were shown. FIG. 7 shows changes in relative density after calcium oxide CaO and magnesium oxide MgO were added in various amounts at a temperature of 1500° C. It can be understood that both additives have an effect of promoting densification of the aluminum oxide ceramics with added amount in the range of 0.5 to 2.0 wt % as in the case of addition of yttrium oxide $Y_2O_3$.

By adding the above-mentioned oxides as sintering aids, the sintering temperature of the aluminum oxide ceramics containing zirconium oxide can be lowered by 50 to 150° C., thus making it possible to reduce production costs.

FIG. 6 shows an example of sintering of aluminum oxide ceramics having 20 wt % of zirconium oxide added thereto, but a similar effect was obtained when 5 to 40 wt % of zirconium oxide was added.

When the amount of sintering aid added is 2.0 wt % or less, production costs can be reduced owing to a decrease in sintering temperature with almost no influences exerted on the drive performance and wear property of the vibration type driving apparatus. If yttrium oxide or the like is added as a stabilizing agent for stabilized or partially stabilized zirconium oxide which is used industrially, a similar effect is obtained.

In this embodiment, aluminum oxide ceramics containing zirconium oxide is used to produce the third elastic member 3, whereby a material property for inhibiting vibration damping (inhibiting internal losses) and a wear resistance, which are inherent in zirconium oxide and the aluminum oxide ceramics, are imparted to the third elastic member 3.

Consequently, the drive efficiency and durability of the vibration type driving apparatus can be improved.

Depending on the structure and performance of the vibration type driving apparatus, the third elastic member 3 may be formed of a metallic material, and a frictional member formed in a ring shape with aluminum oxide ceramics containing zirconium oxide may be provided on the surface of the third elastic member 3, i.e., a surface as a frictional surface. An effect similar to that described above is obtained even with such a configuration.

Even when the contact member 10 of the rotor 9 was formed from alumite obtained by subjecting a metal aluminum to an anodic treatment, considerable wear on the frictional surface of the third elastic member 3 could be inhibited.

The contact member 10 may be formed from aluminum oxide ceramics containing zirconium oxide. The third elastic member 3 and the contact member 10 may be formed from aluminum oxide ceramics containing zirconium oxide. Wear of the contact member 10 and the third elastic member 3 can be inhibited even with such configurations.

In this embodiment, a rod type vibration type driving apparatus has been described, but the present invention can be applied to any types of vibration type driving apparatuses such as a circular ring type, a disk type and a plate type.

As described above, according to this embodiment, production costs of the vibration type driving apparatus can be reduced by forming the third elastic member 3 using aluminum oxide ceramics containing 5 wt % to 40 wt %. At the same time, the mechanical strength and toughness can be improved compared with use of aluminum oxide alone. Consequently, during processing of the third elastic member 3, and the like, occurrence of cracking and chipping can be inhibited, and also an increase in wear can be inhibited. Thus, the lifetime of the vibration type driving apparatus can be improved.

Owing to differences in hardness and elastic coefficient between zirconium oxide and aluminum oxide, very small elevation differences (elevation differences of about 0.2 μm or less) can be provided on the frictional surface after polishing. Consequently, the vibration type driving apparatus can be efficiently driven.

Zirconium oxide and aluminum oxide have a property for inhibiting vibration damping, and therefore by forming the third elastic member 3 using these materials, drive efficiency of the vibration type driving apparatus can be improved. Moreover, aluminum oxide is inexpensive, thus making it possible to reduce the cost of the vibration type driving apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2004-251977 filed on Aug. 31, 2004, which is hereby incorporated by reference herein.

What is claimed is:

1. A vibration type driving apparatus comprising:
    an elastic member given vibrations by an electric-mechanical energy conversion element; and
    a contact member contacting the elastic member and driven by vibrations given to the elastic member,
    wherein the elastic member is formed by aluminum oxide ceramics containing 5 wt % to 40 wt % of zirconium oxide, the aluminum oxide ceramics has an arithmetic average height Ra of more than 0.05 μm and 0.2 μm or less for the surface of the member, and maximum values of elevation differences are in the range of 0.05 μm to 0.2 μm between zirconium oxide particles and aluminum oxide particles on the surface,
    wherein the contact member is formed by stainless steel, and
    wherein vibration is generated by the elastic member to drive the contact member, whereby the contact member wears and a wearing powder of the contact member is accumulated in a recess of a surface of the elastic member.

2. The vibration type driving apparatus according to claim 1, wherein the aluminum oxide ceramics contains 10 wt % to 30 wt % of zirconium oxide.

3. The vibration type driving apparatus according to claim 1, wherein the aluminum oxide ceramics contains at least one of yttrium oxide, calcium oxide and magnesium oxide in an amount of 0.1 wt % to 2 wt %.

4. A vibration type driving apparatus comprising:
    an elastic member given vibrations by an electric-mechanical energy conversion element; and
    a contact member contacting a frictional member provided on the elastic member or a contact member provided with a frictional member contacting the elastic member and driven by vibrations given to the elastic member,
    wherein the frictional member is formed by aluminum oxide ceramics containing 5 wt % to 40 wt % of zirconium oxide, the aluminum oxide ceramics has an arithmetic average height Ra of more than 0.05 μm and 0.2 μm or less for the surface of the member, and maximum values of elevation differences are in the range of 0.05 μm to 0.2 μm between zirconium oxide particles and aluminum oxide particles on the surface,
    wherein the contact member is formed by stainless steel, and
    the vibration is generated by the elastic member to drive the contact member, whereby the contact member wears and a wearing powder of the contact member is accumulated in a recess of a surface of the elastic member or the frictional member.

5. The vibration type driving apparatus according to claim 4, wherein the aluminum oxide ceramics contains 10 wt % to 30 wt % of zirconium oxide.

6. The vibration type driving apparatus according to claim 4, wherein the aluminum oxide ceramics contains at least one of yttrium oxide, calcium oxide and magnesium oxide in an amount of 0.1 wt % to 2 wt %.

7. A vibration type driving apparatus comprising:
    an elastic member given vibrations by an electric-mechanical energy conversion element; and
    a contact member contacting the elastic member and driven by vibrations given to the elastic member,
    wherein the elastic member is formed by aluminum oxide ceramics containing 10 wt % to 30 wt % of zirconium oxide, and the aluminum oxide ceramics has an arithmetic average height Ra of more than 0.05 μm and 0.2 μm or less for the surface of the member, has maximum values of elevation differences in the range of 0.05 μm to 0.2 μm between zirconium oxide particles and aluminum oxide particles on the surface, and contains at least one of yttrium oxide, calcium oxide and magnesium oxide in an amount of 0.1 wt % to 2 wt %,
    wherein the contact member is formed by stainless steel, and wherein vibration is generated by the elastic member to drive the contact member, whereby the contact member wears and a wearing powder of the contact member is accumulated in a recess of a surface of the elastic member.

8. A vibration type driving apparatus comprising:

an elastic member given vibrations by an electric-mechanical energy conversion element; and a contact member contacting a frictional member provided on the elastic member or a contact member provided with a frictional member contacting the elastic member and driven by vibrations given to the elastic member, wherein the frictional member is formed by aluminum oxide ceramics containing 10 wt % to 30 wt % of zirconium oxide, and the aluminum oxide ceramics has an arithmetic average height Ra of more than 0.05 µm and 0.2 µm or less for the surface of the member, has maximum values of elevation differences in the range of 0.05 µm to 0.2 µm between zirconium oxide particles and aluminum oxide particles on the surface, and contains at least one of yttrium oxide, calcium oxide and magnesium oxide in an amount of 0.1 wt % to 2 wt %, wherein the contact member is formed by stainless steel, and wherein the vibration is generated by the elastic member to drive the contact member, whereby the contact member wears and a wearing powder of the contact member is accumulated in a recess of a surface of the elastic member or the frictional member.

* * * * *